(12) United States Patent
Larsson et al.

(10) Patent No.: US 12,107,657 B2
(45) Date of Patent: Oct. 1, 2024

(54) METHOD AND APPARATUS FOR BEAM SELECTION IN A WIRELESS COMMUNICATION NETWORK

(71) Applicant: Telefonaktiebolaget LM Ericsson (publ), Stockholm (SE)

(72) Inventors: Kjell Larsson, Luleå (SE); Peter Ökvist, Luleå (SE); Anders Landström, Boden (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 182 days.

(21) Appl. No.: 17/912,573

(22) PCT Filed: Mar. 20, 2020

(86) PCT No.: PCT/SE2020/050296
§ 371 (c)(1),
(2) Date: Sep. 19, 2022

(87) PCT Pub. No.: WO2021/188027
PCT Pub. Date: Sep. 23, 2021

(65) Prior Publication Data
US 2023/0163828 A1    May 25, 2023

(51) Int. Cl.
*H04B 7/02* (2018.01)
*H04B 7/06* (2006.01)
*H04W 24/10* (2009.01)

(52) U.S. Cl.
CPC .......... *H04B 7/0695* (2013.01); *H04W 24/10* (2013.01)

(58) Field of Classification Search
CPC .............................. H04B 7/0695; H04W 24/10
(Continued)

(56) References Cited

U.S. PATENT DOCUMENTS 10,348,394 B1    7/2019  Bakr et al.
10,447,375 B1   10/2019  Padhy et al.
(Continued)

FOREIGN PATENT DOCUMENTS

EP       2896141 B1     3/2020
WO    2014042562 A1     3/2014
(Continued)

OTHER PUBLICATIONS

Qualcomm Incorporated, "Enhancements on Multi-beam Operation", 3GPP TSG-RAN WG1 Meeting #95, R1-1813443, Spokane, Washington, USA, Nov. 12-16, 2018, 1-22.

*Primary Examiner* — Zewdu A Kassa
(74) *Attorney, Agent, or Firm* — Murphy, Bilak & Homiller, PLLC

(57) ABSTRACT

A network node (18) identifies radio beams (50) that are affected by periodic fading at a User Equipment (UE) (12) and penalizes the identified beams (50) with respect to a serving-beam selection procedure that is used to select a serving radio beam (60) for the UE (12). For example, among a set (52) of radio beams (50) that are candidates for serving the UE (12), the serving-beam selection procedure selects one or more of the candidate beams (50) according to rankings determined from radio-signal measurements reported by the UE (12) or from measurements on Sounding Reference Signals (SRS) transmitted by the UE (12). In this context, penalizing a beam (50) means discounting its ranking for purposes of considering it within the beam-selection procedure.

20 Claims, 8 Drawing Sheets

(58) Field of Classification Search
USPC ................ 375/267, 260, 259, 219, 295, 316
See application file for complete search history.

(56) References Cited

U.S. PATENT DOCUMENTS

| | | | |
|---|---|---|---|
| 10,666,342 | B1 | 5/2020 | Landis et al. |
| 2018/0368004 | A1 | 12/2018 | Subramanian et al. |
| 2021/0242928 | A1* | 8/2021 | Park ........................ H04B 7/088 |
| 2022/0393748 | A1* | 12/2022 | Hill ........................ H04W 64/00 |

FOREIGN PATENT DOCUMENTS

| | | |
|---|---|---|
| WO | 2016119201 A1 | 8/2016 |
| WO | 2018195841 A1 | 11/2018 |

* cited by examiner

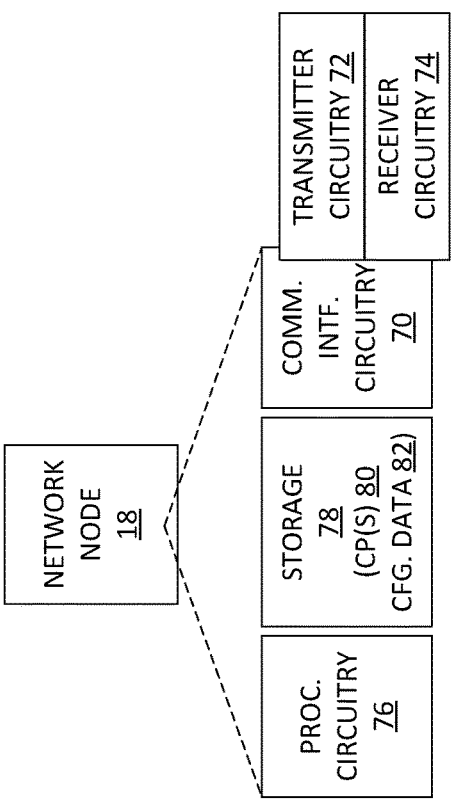
FIG. 4
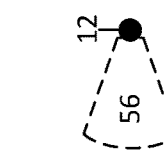
FIG. 6
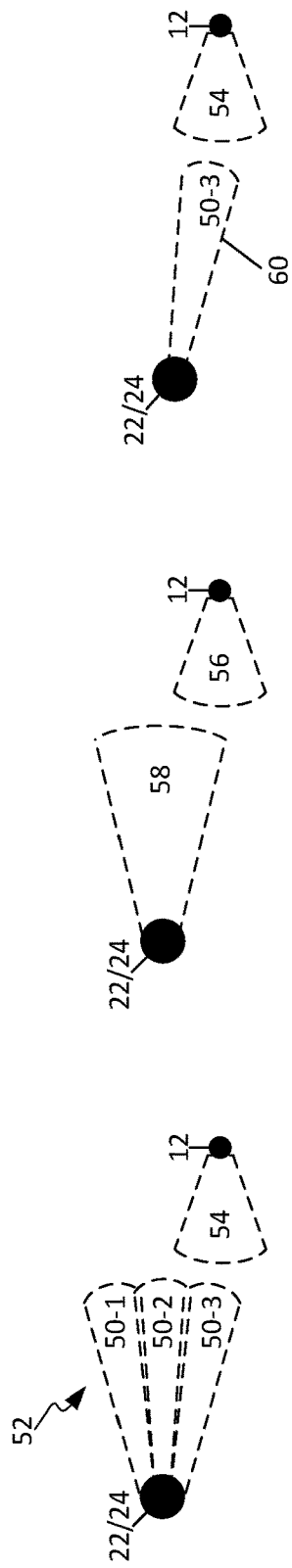
FIG. 7A
FIG. 7B
FIG. 7C

| BEAM # | RAW RANKING | EVAL? | CANDIDATE? | PENALIZE? | P. VALUE | P. TMR |
|---|---|---|---|---|---|---|
| BEAM 50-1 | NA | YES | NO | NA | NA | NA |
| BEAM 50-2 | 1 | YES | YES | YES | X | T1 |
| BEAM 50-3 | 3 | YES | YES | NO | NA | NA |
| BEAM 50-4 | 2 | YES | YES | YES | Y | T2 |
| BEAM 50-5 | NA | NO | NO | NO | NA | NA |
| ... | ... | ... | ... | ... | ... | ... |
| BEAM 50-N | NA | NO | NO | NO | NA | NA |

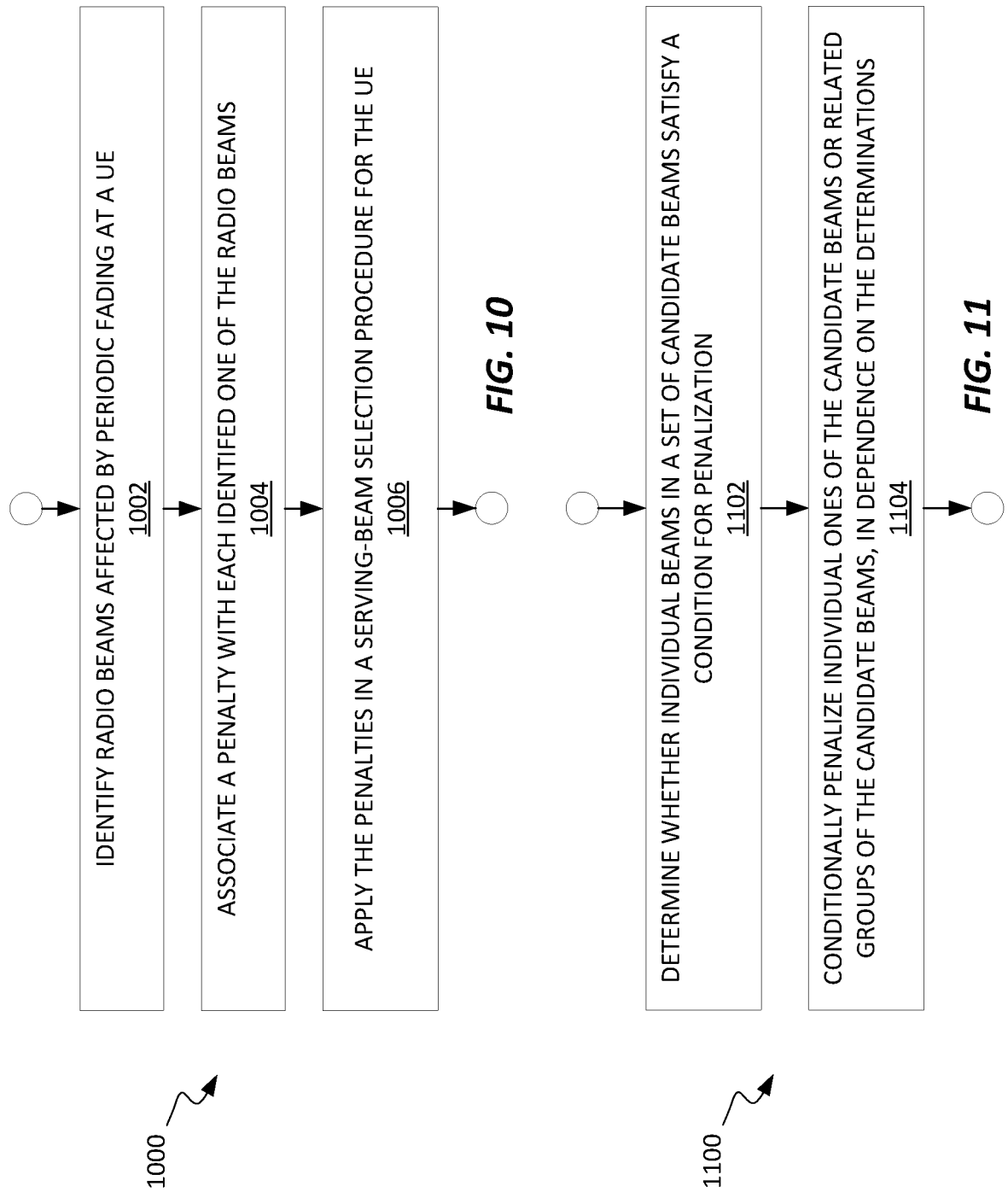

METHOD AND APPARATUS FOR BEAM SELECTION IN A WIRELESS COMMUNICATION NETWORK

BACKGROUND

"Link adaptation or "LA" refers to the practice of changing one or more transmission parameters used for transmitting a communication signal, to account for changing radio conditions. Manipulating the modulation and coding scheme (MCS) responsive to measured changes in the radio link represents one example of link adaptation. Lower modulation orders are more robust but convey fewer bits per modulation symbols, and higher coding rates are more robust but decrease the throughput of new information. Additionally, or alternatively, link adaptation involves dynamic adjustment of transport block sizes or transmission power.

Taking an example case of a wireless communication network in which a base station transmits data to a User Equipment (UE), the base station adapts the downlink toward the UE in response to Channel Quality Indicator (CQI) feedback, or, more broadly, Channel State Information (CSI) feedback from the UE, such as feedback indicating Reference Signal Received Power (RSRP) at the UE, for a reference signal transmitted by the base station. Consistent with the above examples, a non-limiting approach involves the base station adapting the MCS used for transmitting data to the UE, responsive to changes in the CQI or CSI feedback from the UE.

As a specific example of a LA algorithm, a so-called "jump" algorithm backs off from a control target more quickly than it returns. When performing LA on a radio link between a TRP and a UE, the jump algorithm decreases a target level by a downward step in response to a negative acknowledgment (NACK) of a Hybrid Automatic Repeat reQuest (HARQ) transmission over the involved radio link and increases the target level by an upward step in response to a positive acknowledgement (ACK). However, the upward step size is a fraction of the downward step size, meaning that the target level operated on by the jump algorithm climbs back towards its pre-NACK level more slowly than it fell. The climbing rate may be, for example, $\frac{1}{10}$th or $\frac{1}{100}$th of the fall-back rate. Consequently, while jump algorithms respond well to sudden decreases in channel quality, the long "time constant" associated with climbing back to a more aggressive target level in response to improved channel conditions makes it difficult for the jump algorithm to handle certain scenarios.

SUMMARY

A network node identifies radio beams that are affected by periodic fading at a User Equipment (UE) and penalizes the identified beams with respect to a serving-beam selection procedure that is used to select a serving radio beam for the UE. For example, among a set of radio beams that are candidates for serving the UE, the serving-beam selection procedure selects one or more of the candidate beams according to rankings determined from radio-signal measurements reported by the UE or from measurements on Sounding Reference Signals (SRS) transmitted by the UE. In this context, penalizing a beam means discounting its ranking for purposes of considering it within the beam-selection procedure.

In an example embodiment, a method of operation by a network node of a wireless communication network includes identifying radio beams that are affected by periodic fading at a UE, from among a set of radio beams that are candidates for serving the UE. The method further includes associating a penalty with each identified one of the radio beams and applying the penalties in a serving-beam selection procedure that is used to select one of the radio beams for serving the UE.

A related embodiment involves a network node configured for operation in a wireless communication network. The network node includes communication interface circuitry and processing circuitry operative to send and receive signals via the communication interface circuitry. The processing circuitry is configured to identify radio beams affected by periodic fading at a UE, from among a set of radio beams that are candidates for serving the UE. The processing circuitry is further configured to associate a penalty with each identified one of the radio beams and apply the penalties in a serving-beam selection procedure that is used to select one of the radio beams for serving the UE.

In another embodiment, the network node includes an identifying module configured to identify radio beams affected by periodic fading at a UE, from among a set of radio beams that are candidates for serving the UE. Additional modules of the network node include an associating module configured to associate a penalty with each identified one of the radio beams, and an applying module configured to apply the penalties in a serving-beam selection procedure that is used to select one of the radio beams for serving the UE.

In yet another embodiment, a non-transitory computer-readable medium storing a computer program comprising instructions that, when executed by a processor of a network node in a wireless communication network, causes the network node to: identify radio beams affected by periodic fading at a User Equipment UE, from among a set of radio beams that are candidates for serving the UE, associate a penalty with each identified one of the radio beams, and apply the penalties in a serving-beam selection procedure that is used to select one of the radio beams for serving the UE.

In a further embodiment, a network node configured for operation in a wireless communication network includes communication interface circuitry and processing circuitry that is operative to send and receive signals via the communication interface circuitry. Further, the processing circuitry is configured to conditionally penalize one or more candidate beams in a set of candidate beams that, with respect to a Transmission Reception Point (TRP) of the wireless communication network, are candidates for serving a UE. Each penalized candidate beam is excluded from or disfavored in a serving-beam selection procedure used to select a serving beam for the UE, from among the set of candidate beams. The processing circuitry conditions the penalization of individual ones or related groups of the candidate beams in the set of candidate beams, in dependence on determining whether the UE experiences periodic fading with respect to the individual ones or related groups of the candidate beams in the set of candidate beams.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a block diagram of one embodiment of an antenna system, suitable for use by a TRP in performing transmission or reception beamforming.

FIG. 6 is a block diagram of one embodiment of a network node that is operative to apply penalties in serving-beam selection procedure performed for a UE.

FIGS. 7A, 7B, and 7C are diagrams illustrating radio beams that are candidates for serving a UE from a TRP.

FIGS. 10 and 11 are logic flow diagrams of respective embodiments of a method implemented by a network node, for applying penalties in serving-beam selection procedure performed for a UE.

DETAILED DESCRIPTION

In general, Link Adaptation (LA) algorithms, such as jump algorithms, prevent long sequences of errors when the radio link (channel) suddenly becomes bad. However, such algorithms perform less well when the radio conditions change more rapidly than the time constant of the LA algorithm. A point recognized herein is that the overall network or system performance suffers when the involved radio channels have relatively good radio quality between impairment occurrences, where the impairments occur on a time scale on par with, or slightly shorter than, the time constant of the LA algorithm.

In an example case, the jump algorithm reacts to an occurrence of link impairment by jumping back, e.g., in terms of Modulation and Coding Scheme (MCS). Depending on the specific configuration, it may take about 10 times to 100 times as long to step back up. Depending on the interval between impairment events on the radio link, the jump algorithm may not have returned to an appropriate MCS before being knocked down again, because of a negative acknowledgement of a preceding transmission. Consequently, there are scenarios, where the jump algorithm may result in the involved transmission parameters being maintained well below their optimal values, despite the link quality being good during the intervals between the impairment events. Such applies to instances where the impairments are rather short, as compared to the intervals during which the channel has good quality.

While incorporating "freeze" or "no-action" mechanisms prevent the jump algorithm from stepping back too far in the presence of burst errors, a key point recognized herein is that such mechanisms leave unaddressed scenarios where the link quality is good except for periodic impairment events occurring on a periodicity at or near the LA time constant of the jump algorithm. Of course, LA algorithms besides the jump algorithm may suffer the same or similar deleterious behavior in the presence of periodic fading.

Figures 1, 2:
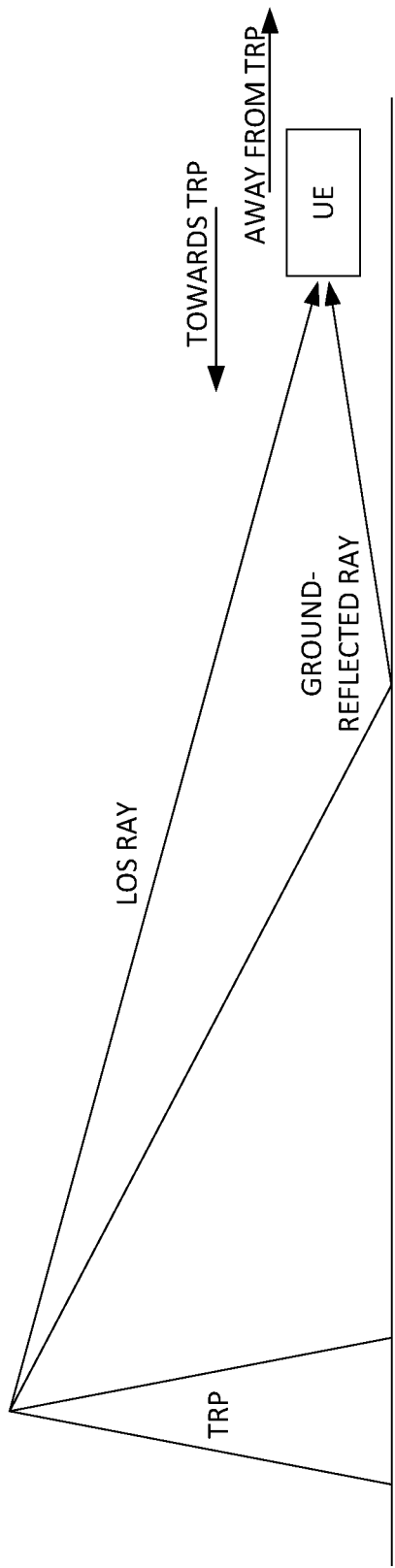
FIG. 1 is a block diagram of a radio environment involving a Transmission Reception Point (TRP) of a wireless communication network and a User Equipment (UE), where the UE is vulnerable to periodic fading.
FIG. 2 is a diagram of example Time Division Duplexing (TDD) configurations individually usable by a TRP, and with each TDD configuration being associated with a different Link Adaptation (LA) time constant, as a consequence of the particular ratio and distribution of uplink and downlink allocations defined as the TDD configuration.

FIG. 1 illustrates a scenario associated with periodic fading; namely, in propagation scenarios where there is a Line-of-Sight (LOS) ray and a ground-reflected ray between a Transmission Reception Point (TRP) and a User Equipment (UE), the LOS ray and the ground-reflected ray may combine at the UE constructively (add) or destructively (subtract). In particular, when the UE moves towards or away from the TRP, the two rays may exhibit a periodic alternation between adding and subtracting, meaning that the UE experiences a characteristic periodic fading. The phenomenon depends on the real-world propagation environment, carrier frequency, relevant geometries, such as antenna height(s) above the ground, and further on the velocity of the UE relative to the TRP.

Consider an example scenario where a downlink transmission beam of a beamforming TRP aligns with a highway. Vehicle-mounted or vehicle-carried UEs traveling along that stretch of highway may experience periodic fading due to two-ray ground reflection in their uplink and/or downlink connections as they approach the TRP or recede from it, with the periodicity of the fading depending on vehicle speed. For simplicity, the phrase "periodic fading" refers to the foregoing fading phenomenon, unless otherwise qualified in context. Similar effects apply to UEs integrated with or conveyed on trains moving along stretches of track that are aligned with downlink/uplink transmission beams of a TRP. If the TRP uses a LA algorithm with a LA adaptation time constant that is about the same or greater than the periodicity of periodic fading experienced by one or more UEs being served by the TRP, link adjustments will never "catch up" to or account for the periodic fading impairments.

More particularly, the periodic fading impairments will drive link adaptations towards transmission-parameter settings that are too conservative with respect to the radio-link conditions experienced between the periodic fading events. Hence, the UE(s) experiencing those conditions will operate with radio links having transmission-parameter adaptations that are too conservative, meaning that system efficiency suffers. With wireless communication networks evolving towards higher carrier frequencies, extensive use of beamforming, and higher bitrates, the underperformance of established LA algorithms in the presence of periodic fading will become an increasingly significant problem.

Adaptations of the Time Division Duplexing (TDD) configuration of a TRP represents an advantageous mechanism for adapting the time constant of the LA algorithm used by the TRP for performing link adaptations on the radio link(s) between it and the UEs served by it. Broadly, the term "TDD configuration" describes the duplexing arrangement applied to downlink and uplink directions, and a key aspect is that the TDD configuration used by a TRP defines the rate or number of opportunities provided for the exchange of feedback information between the TRP and its served UEs. For example, consider an example where the TRP performs link adaptations for a radio link between the TRP and a UE in dependence on the feedback of downlink measurements from the UE. The response time or time constant of the LA algorithm used to perform the link adaptations depends on how frequently the TRP receives new feedback from the UE, and the TDD configuration influences the possible feedback rates.

FIG. 2 provides a non-limiting example of possible TDD configurations that may be used by a TRP, where the letter "D" denotes a downlink allocation and "U" represents an uplink allocation. For example, the TRP uses a radio signal structure based on recurring "frames" with each frame subdivided into a number of subframes. In that context, each "D" in FIG. 2 may represent a subframe allocated for downlink transmissions and "U" may represent a subframe allocated for uplink transmissions. The TDD configuration denoted as "#0" has many more uplink subframes than downlink subframes and may be an advantageous configuration to use when there is more uplink traffic than downlink traffic. Conversely, the TDD configuration denote as "#N" has many more downlink subframes than uplink subframes and may be an advantageous configuration to use when there is more downlink traffic than uplink traffic.

Of course, there may be many defined TDD configurations that can be used at the TRP and the pattern or distribution of uplink and downlink subframes is also an important consideration. Compare the "#1" configuration in FIG. 2 with the "#2" configuration. While both configurations may have an overall 1:1 ratio of downlink-to-uplink subframes, the #1 configuration offers a uniform distribution of alternating downlink and uplink subframes, whereas the #2 configuration includes a run of downlink subframes followed by a run of uplink subframes. As such, recognizing that the TDD configuration influences the time constant of the LA algorithm employed by a TRP encompasses at least two aspects. First, the "TDD ratio" of uplink and downlink allocations represents one factor that determines how frequently LA feedback can be exchanged between the served UEs and the TRP. Second, the "TDD pattern" of uplink and downlink allocations—the distribution or arrangement of uplink and downlink allocations over a defined interval, such as a frame—represents another factor that determines how frequently LA feedback can be exchanged between the served UEs and the TRP.

However, even in cases involving the dynamic adaptation of the TDD configuration used by a TRP to ameliorate impairments arising from UEs experience periodic fading in the radio beam or beams used by the TRP to serve the UEs, a key recognition herein is that the procedure used to select a serving beam for a particular UE should account for the effects of periodic fading at the UE.

Consider an example serving-beam selection procedure used to find the "best" one among the radio beams that are candidates for serving a UE. Here, a "serving" radio beam provides radio connectivity between the UE and the network. In an example case, the radio beams are downlink radio beams—directionally-focused emissions of electromagnetic energy conveying information—and particular radio beams from one or more TRPs are candidates for serving the UE if they meet some minimum threshold for received-signal quality or strength at the UE, as measured by the UE on reference signals or other signals conveyed in the radio beams, which may be more simply referred to as "beams."

Although more than one serving beam may be selected and used, a simple example involves selecting a single serving radio beam from among the candidate beams, based on ranking the candidate beams according to their corresponding "scores," which may be the received-signal strengths or qualities indicated by the UE. In more detail, to find the best beam to use for serving the UE, the network performs a beam sweep, i.e., it transmits a selected set of candidate beams, and selects the active beam based on radio-signal measurements reported by the UE for the candidate beams. The process typically includes a TRP selecting a set of candidate beams, which may include the currently active transmit beam of the UE, and the TRP transmits a Channel-State-Information Reference Signal (CSI-RS) in each of the candidate beams.

The UE measures CSI-RS on assigned resources for the respective candidate beams and reports up to N best CSI-RS resources and corresponding quality values, such as Reference Signal Received Power, as measured at the UE for the received CS-RSs. The TRP receives the measurement report from the UE and selects which one of the candidate beams to use as the serving beam for the UE. The process may be repeated in recurring intervals, where each round of selection involves time for the beam sweep, the reporting by the UE, and the corresponding evaluation and selection by the TRP, and may involve milliseconds, for example.

As recognized herein, however, one of the issues with periodic fading at the UE with respect to any particular beam is that the UE may experience good reception conditions during the intervals between periodic fading events. Consequently, the UE may report good signal conditions for the beam, although actual communication performance on the beam will be less good than the reported signal conditions indicate, because of the deleterious effects of periodic fading on LA performed by the TRP with respect to the UE. Various embodiments of a solution contemplated in this disclosure incorporate consideration of periodic fading into the beam selection process, to penalize beams for purposes of the selection process, in dependence on whether the UE experiences periodic fading with respect to them.

In at least one embodiment, saying that the UE "experiences periodic fading" with respect to any particular beam means that the UE experiences periodic fading that satisfies one or more conditional criteria, such as periodic fading having a periodicity in or above the range of the LA "time constant", which can be understood as reflecting the responsiveness of the LA used by the TRP for adapting the radio link between the UE and the TRP. Additionally, or alternatively, the UE is not considered to be experiencing periodic fading with respect to a particular beam unless the severity of the fading satisfies some minimum or threshold condition.

Figure 3A:
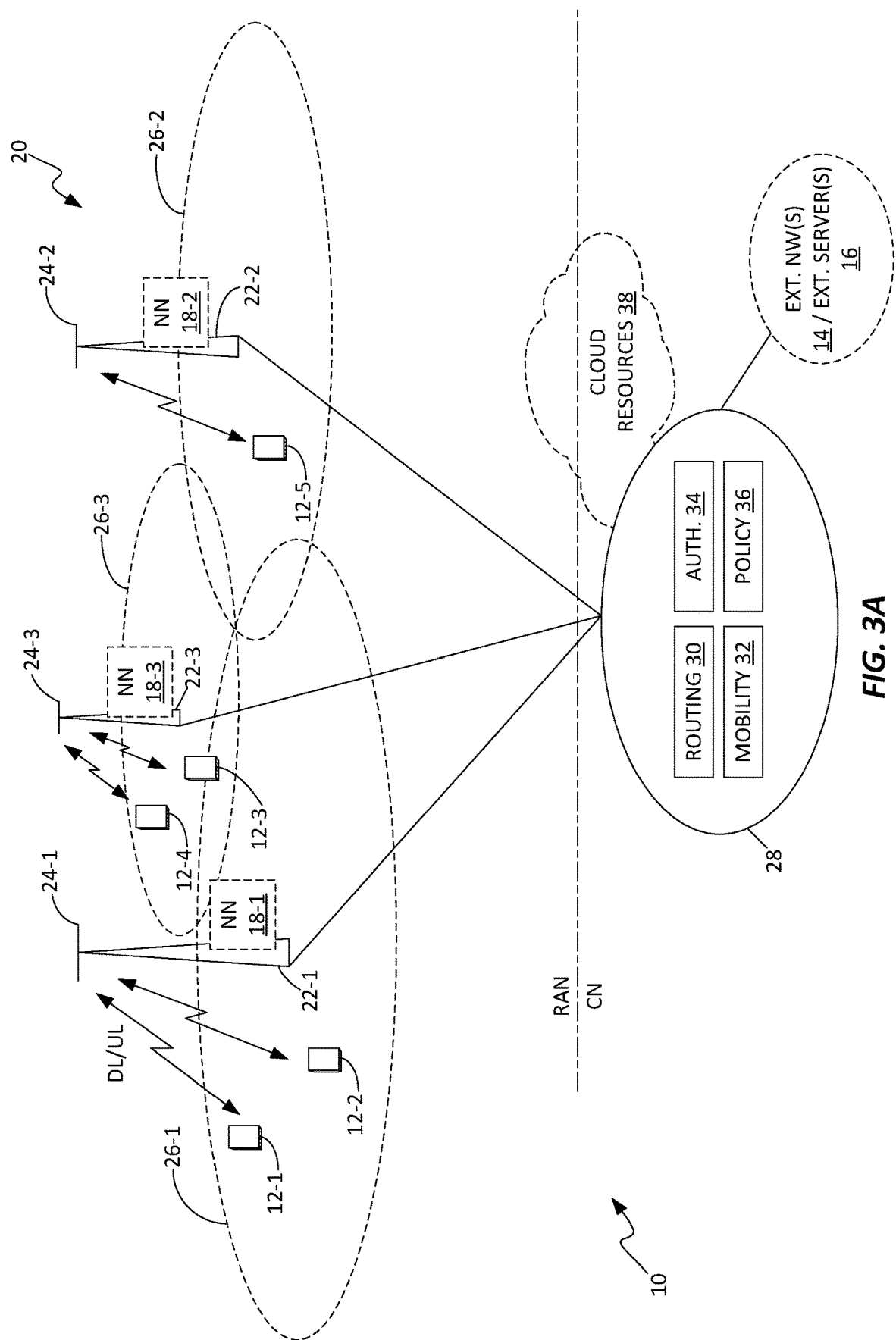
FIGS. 3A, 3B, and 3C are block diagrams of example embodiments of a wireless communication network that includes a network node that is operative to apply penalties in serving-beam selection procedure performed for a User Equipment (UE).
Figure 3B:
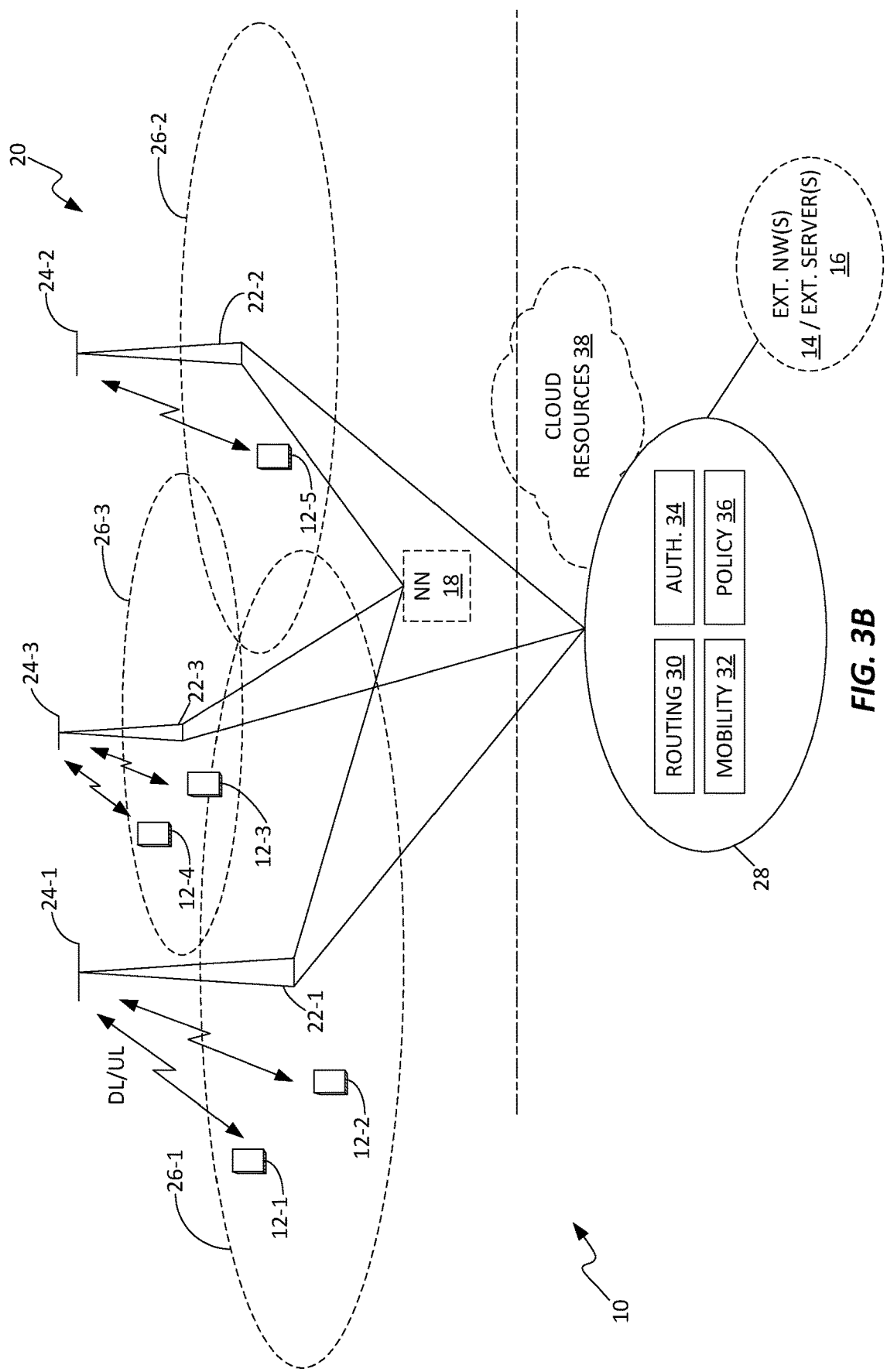
Figure 3C:
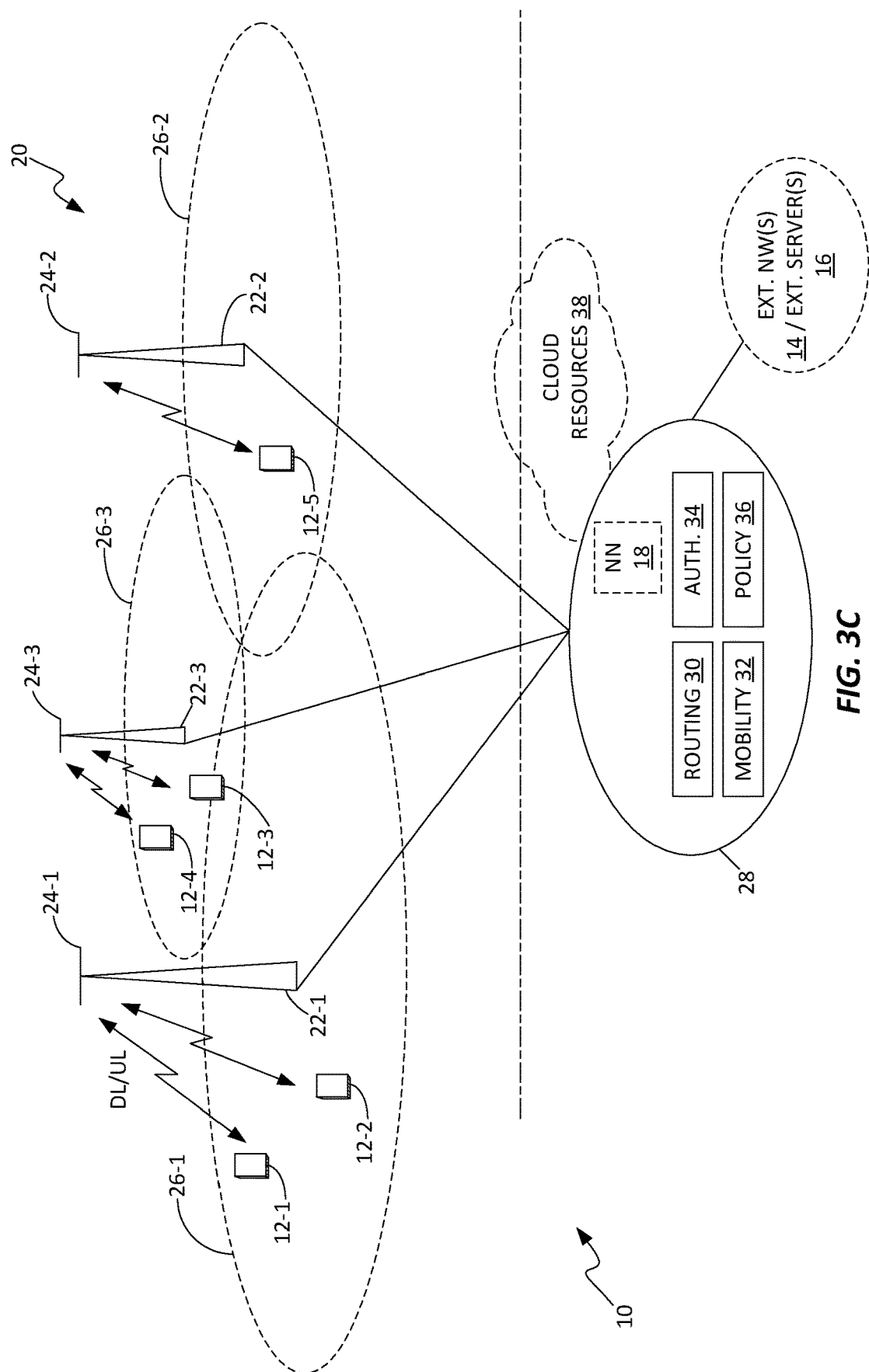

In any case, FIGS. 3A, 3B, and 3C illustrate example embodiments of a wireless communication network 10 that includes one or more entities operative to trigger TDD configuration adaptations at one or more TRPs in the network, to ameliorate the problem(s) in beam selection that arise when the periodicity of fading at the UE for one or more of the beams under consideration approaches the time constant of the LA algorithm(s) in use at the TRP(s). The wireless communication network 10—"network 10"—comprises, for example, a Third Generation Partnership Project (3GPP) network, such as a Fifth Generation (5G) New Radio (NR) network.

The depicted network 10 provides communication services to one or more User Equipments (UEs) 12, with UEs 12-1, 12-2, 12-3, 12-4, and 12-5 depicted by way of example. For the reference number "12," suffixing may be used for clarity, but the number "12" without suffixing may also be used, either to refer to UEs in a singular or a plural sense. The same approach holds for other references numbers that may have suffixing in the drawings.

Providing communication services to the UEs 12 comprises, for example, providing access to one or more external networks ("NW(s)") 14, which may include or provide access to one or more external servers 16. For example, the network 14 is the Internet or another Packet Data Network (PDN). Broadly, the communication services provided by or through the network 10 include, for example, voice services, data services, messing services, machine-communication services, etc. The particular services used by a given UE 12 depends on its capabilities and intended use, and the UEs 12 may be of the same or different types, e.g., a mix of smartphones, mobile computing devices, Machine Type Communication (MTC) devices, etc. As such, the term "User Equipment" has broad meaning, with the "User" component of the term denoting equipment that uses the network 10 rather than entities that belong to the network infrastructure. In an example case, one or more of the UEs may be embedded, such as integrated into automobiles for Vehicle-to-Everything (V2X) operations.

A Radio Access Network (RAN) 20 portion of the network 10 includes one or more TRPs 22, with TRPs 22-1, 22-2, and 22-3 shown by way of example. The TRPs 22 may or may not be of like types and capabilities, e.g., they may have different transmit-power capabilities, different antenna arrangements, etc. Thus, although each TRP 22 is depicted with a corresponding antenna system 24 and a corresponding coverage area 26, there may be differences in the antenna systems 24 and/or the coverage areas 26. At least one of the TRPs 22 is configured for beamforming operations, e.g., transmit beamforming and/or uplink beamforming, with the antenna system 24 comprising, for example, an array of antenna elements supporting beamforming. Correspondingly, although the coverage areas 26 appear uniform, one or more of the TRPs 22 may use a plurality of directional transmission and/or reception beams to "cover" the depicted coverage area.

A Core Network (CN) portion 28 of the network 10 provides, among other functions, routing, authentication, mobility control, and policy control for UEs 12 served via the RAN 20. One or more routing nodes 30, authentication nodes 34, mobility management nodes 32, and policy control nodes 36 cooperate to provide the various core-network functionality. At least some of the CN nodes may be implemented in a cloud-computing or data-center computing environment, e.g., via virtualized instantiation on data-center servers, which are broadly denoted as "cloud resources" 38 in the diagram. Of course, the cloud resources 38 may additionally or alternatively support RAN functionality, and, correspondingly, they are showing as extending into or otherwise supporting the RAN 20.

Various details regarding the network 10 may be varied as a function of intended use and network type, e.g., different "generations" of standards-based networks may split, rearrange, or add functions and the nodal/functional nomenclature may change accordingly. Such details are, in general, not germane to the techniques of interest herein, which are represented by way of example via a network node 18 ("NN" in FIGS. 3A, 3B, and 3C) and its associated functionality.

FIG. 3A depicts a copy or instantiation of the network node 18 at each of the three example TRPs 22, e.g., a network node 18-1 at the TRP 22-1, a network node 18-2 at the TRP 22-2, and a network node 18-3 at the TRP 22-3. Each network node 18 in this scenario may be co-located with its respective TRP 22. Here, the term "co-located" encompasses integration, such that a network node 18 can be considered as a functional portion of a corresponding TRP 22.

In one example where the network nodes 18 are integrated with respective TRPs 22, communications between network nodes 18 may be carried out using inter-TRP communication links, possibly with appropriate protocol provisions or extensions. Alternatively, the network nodes 18 may include dedicated interfaces and protocols for exchanging communications. As a further alternative, at least some of the functionality of the network node(s) 18 resides in the cloud resources 38, with corresponding connectivity into the RAN 20.

FIG. 3B differs from FIG. 3A by depicting an alternative implementation that involves a centralized implementation of the network node 18. A single network node 18 serves all three TRPs 22-1, 22-2, and 22-3 in the depicted example. More generally, the network 10 may include multiple network nodes 18, with each one serving a given number of TRPs 22, or with individual network nodes 18 allocated to defined "areas" of the network 10, such as defined mobility or tracking areas. With centralization, a given network node 18 may be co-located with a given TRP 22 and provide processing and control for multiple TRPs 22, or it may reside physically and geographically separate from any of the TRPs 22 that it supports. A centralized network node 18 may be at least partly implemented via the cloud resources 38.

FIG. 3C illustrates another implementation example, where one or more network nodes 18 reside in the CN 28, meaning that the network node(s) 18 communicate with one or more corresponding TRPs 22 in the RAN 20. A CN-based implementation of the network node 18, or any number of copies or instantiations thereof, means that the network node 18 may be co-located with or integrated within another node in the CN 28, or may be implemented as a stand-alone node within the CN 28. And, as with the other embodiments, the network node(s) 18 may be at least partly implemented in the cloud resources 38.

FIG. 4 illustrates an example antenna system 24 for a TRP 22 that is configured for beamforming operation. Included in the antenna system 24 is an antenna array 40 comprising a plurality of antenna elements 42. With 5G NR and future evolutions of wireless networks, the antenna array 40 may comprise a relatively large number of antenna elements 42, allowing for narrow, high-gain transmission and/or reception beams. One or more beam directions may align with coverage areas where served UEs 12 are particularly vulnerable to periodic fading, such as beams that align with a stretch of highway, a stretch of train tracks, etc. Here, a UE 12 is a "served UE" with respect to a TRP 22 if it has a radio link with the TRP 22.

Figure 5:
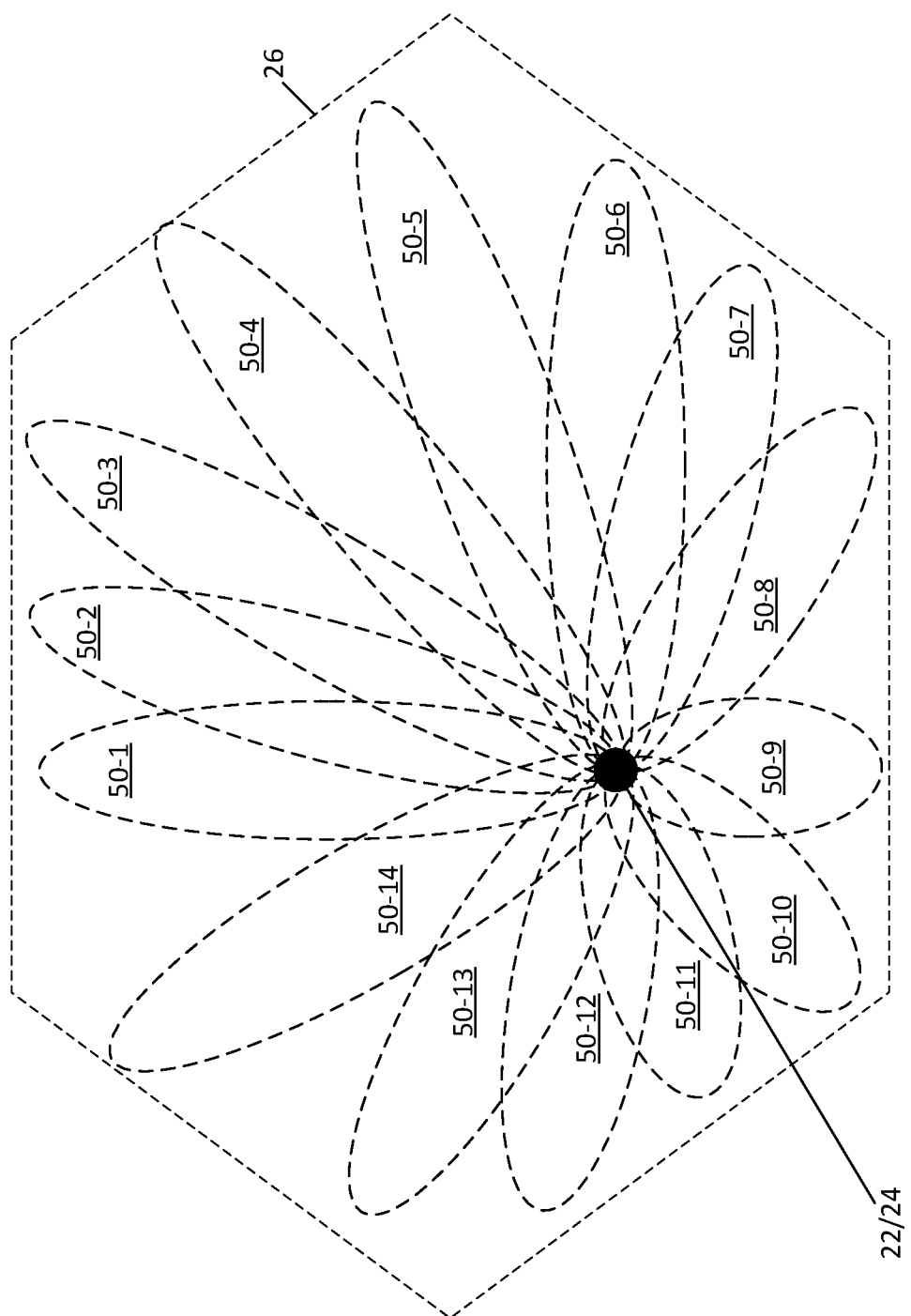
FIG. 5 is a diagram of an example set of beams used by a TRP.

FIG. 5 illustrates an example beamforming scenario for a TRP 22 and its associated antenna system 24. The TRP 22 provides radio coverage for a given overall coverage area 26 using a plurality of directional beams 50, e.g., 50-1 through 50-14. The beams 50 may represent direction transmission, directional reception, or both. In a transmit-beam example, the TRP 22 may transmit each beam 50 individually, in a sequence or pattern referred to as a "beam sweep".

FIG. 6 illustrates an example implementation of a network node 18, with the understanding that the depicted embodiment is non-limiting. Other arrangements of processing and communication circuitry may be used to realize the functionality described herein for the network node 18.

Elements of the example network node 18 include communication interface circuitry 70, including transmitter circuitry 72 and receiver circuitry 74. Further elements include processing circuitry 76 and integrated or associated storage 78, such as may be used for holding one or more computer programs 80 ("CPs") or configuration data 82 ("CFG. DATA").

The implementation details of the communication interface circuitry 70 depend on whether the network node 18 is standalone or integrated with another node in the network 10 or implemented at least partly within the cloud resources 38.

In general, however, the communication interface circuitry 70 includes wireline or wireless physical-layer circuitry configured for transmitting and receiving over the involved propagation medium. Non-limiting examples include inter-processor or inter-server parallel or serial bus interface circuitry or computer-network interface circuitry, such an Ethernet-based interface circuitry.

The processing circuitry 76 is operatively associated with the communication interface circuitry 70, e.g., it is configured to send and receive messages or other signaling via the communication interface circuitry 70. The processing circuitry 76 comprises programmed circuitry or fixed circuitry, or a combination of programmed and fixed circuitry. In an example embodiment, the processing circuitry 76 comprises one or more microprocessors, Digital Signal Processors (DSPs), Field Programmable Gate Arrays (FPGAs), Application Specific Integrated Circuits (ASICs), or other digital processing circuits.

In at least one embodiment, the processing circuitry 76 is configured at least in part based on its execution of computer instructions included in one or more computer programs 80 stored in the storage 78. As noted, the storage 78 may also store one or more items of configuration data 82 associated with operation of the network node 18. The storage 78 comprises, for example, one or more types of computer-readable media, such as a Solid State Disk (SSD), FLASH, DRAM, SRAM, etc. In one embodiment, the storage 78 provides for long-term storage of the computer program(s) 80, and further provides working memory for operation of the processing circuitry 76.

With the example details of FIG. 6 in mind, FIG. 7A illustrates a TRP 22 transmitting, via its beamforming antenna 24, Channel State Information Reference Signals (CSI-RS) in each beam 50 in a set 52 of beams 50, e.g., beams 50-1, 50-2, and 50-3. A UE 12 may use a beam 54 for receiving the CSI-RS transmissions in each of the beams 50.

In the context of FIG. 7B, the UE 12 uses beam 56 for transmitting measurement reports to the TRP 22, indicating the results of its CSI-RS measurements. The TRP 22 may use a beam 58 for receiving the measurement-report transmission from the UE. In an example case, the UE 12 sends the measurement-report information via a Physical Uplink Control Channel (PUCCH) transmission or a Physical Uplink Shared Channel (PUSCH) transmission, beam-formed according to the beam 56.

In the context of FIG. 7C, the TRP 22 evaluates the measurement-report information to select a "best" one of the beams 50 in the set 52, to use as a serving beam 60 for the UE 12, at least for a current or next evaluation interval. In the depicted example, the TRP 22 selects the beam 50-3 as the serving beam 60 to use for the UE 12, and the UE 12 uses the beam 54 for receiving the serving beam 60—i.e., for receiving the directional downlink transmission by the TRP 22 transmitted via the serving beam 60. The TRP 22 may repeatedly perform measurement-report evaluations to update its serving-beam selection for the UE 12, to account for changing reception conditions, e.g., arising from movement of the UE 12.

Unlike any conventional beam-selection procedure, however, selection of the "best" beam 50 for serving the UE 12 penalizes individual ones or related groups of the beams 50 that are candidates for serving the UE 12, in dependence on whether the individual ones or related groups of the beams 50 are affected by period fading at the UE. In one example case, a network node 18 associated with the TRP 22 determines penalties for any beams 50 in the set 52 that are detected as being affected by periodic fading at the UE 12, so that the rankings or scores of the penalized beams 50 are reduced for purposes of the serving-beam selection procedure, so that the penalized beams are discounted—disfavored or eliminated from consideration.

In an example implementation, a network node 18 is configured for operation in a wireless communication network, e.g., the network 10 depicted in any of FIGS. 3A, 3B, and 3C. With reference back to FIG. 6, the network node 18 includes communication interface circuitry 70 and processing circuitry 76 that is operative to send and receive signals via the communication interface circuitry 70. The processing circuitry 76 is configured to: (a) identify radio beams 50 affected by periodic fading at a UE 12, from among a set 52 of radio beams 50 that are candidates for serving a UE 12, (b) associate a penalty with each identified one of the radio beams 50, and (c) apply the penalties in a serving-beam selection procedure that is used to select one of the radio beams 50 for serving the UE 12.

For example, each radio beam 50 in the set 52 has a corresponding ranking determined in dependence on radio-signal measurement reports from the UE 12, and, correspondingly, the processing circuitry 76 is configured to apply the penalties in the serving-beam selection procedure. In particular, the processing circuitry 76 penalizes the corresponding ranking of each identified one of the radio beams 50 according to the associated penalty.

In at least one embodiment of the network node 18, unless doing so would exclude all of the radio beams 50 in the set 52 from selection consideration in the serving-beam selection procedure, the penalties associated with the identified ones of the radio beams 50 exclude the identified ones of the radio beams 50 from selection consideration in the serving-beam selection procedure. When considering each penalty as being a "discount" or "derating factor" or "scalar" to be applied to the corresponding rank or score of the beam 50 (or related beams 50) with which the penalty is associated, the penalty may zero or otherwise null the rank or score, so that the associated beam(s) 50 are excluded from consideration in the serving-beam selection procedure.

In one or more other embodiments, the penalty associated with each identified one of the radio beams 50 has a value dependent on a determined severity of the period fading at the UE 12 for the identified one of the radio beams 50. For example, the processing circuitry 76 calculates a fractional weight value as the penalty, in dependence on the severity of the periodic fading experienced by the UE 12 with respect to the associated beam(s) 50. Here, "severity" denotes, for example, the extent to which the detected fading meets or exceeds one or more conditions that are known or expected to reduce communication throughput. Severity can be assessed, for example, in terms of the fading periodicity, where a shorter periodicity is more problematic, at least when the periodicity is in the range of the LA time constant or even shorter. Additionally, or alternatively, severity may be evaluated based on the measurement report(s) from the UE 12, such as the magnitude of the loss in received-signal quality or strength during the periodic fading events. Additionally, or alternatively, the presence or severity of periodic facing may be detected or determined from Sounding Reference Signals (SRS) transmitted by the UE 12 and received by one or more TRPs 22.

Another embodiment of the network node 18 also determines the penalty to be associated with a radio beam 50 in dependence on the severity of the periodic fading experienced at the UE 12 with respect to the beam 50. Here, however, the penalty levels or values are quantized, meaning that there is a predefined set of penalty values. Different ones of the penalty values correspond to different levels or extents of "severity" regarding the periodic fading.

In the same or another embodiment, the penalty associated with each identified one of the radio beams 50 has a corresponding duration dependent on a determined severity of the periodic fading at the UE 12 for the identified one of the radio beams 50. Additionally, or alternatively, the processing circuitry 76 is configured to make new penalty decisions for the UE 12 in recurring evaluation intervals. Additionally, or alternatively, for at least one of the identified ones of the radio beams 50, the processing circuitry 76 is further configured to associate the penalty with each of one or more directionally-adjacent ones of the radio beams 50 in the set 52. Such operations are an example of penalizing a related group of beams 50, responsive to the UE 12 being affected by periodic fading on any one or more of the beams 50 in the related group.

In at least one embodiment, the processing circuitry 76 is configured to identify radio beams 50 affected by periodic fading at the UE 12 by determining whether radio-signal measurements reported by the UE 12 for respective ones of the radio beams 50 in the set 52 exhibit periodic fading with a fading periodicity above or in a range that corresponds to a LA time constant used by the one or more TRPs 22 in the network 10 that are associated with the radio beams 50 in the set 52. As one example, the processing circuitry 76 evaluates RSRP measurements or other types of radio-signal measurements made by the UE 12 with respect to individual beams 50, in one or multiple measurement reports by the UE 12, to detect whether the UE 12 experiences periodic fading with respect to the individual beams 50. To the extent that the network node 18 is remote from the TRP(s) 22 receiving the measurement report(s) from the UE 12, the TRP(s) 22 may forward the measurement report(s) to the network node 18, or forward information derived therefrom.

Where the network node 18 is remote from a TRP 22, the TRP 22 performs the serving-beam selection procedure, and the processing circuitry 76 is configured to apply the penalties in the serving-beam selection procedure by sending signaling to the TRP 22, to indicate the penalties and thereby cause the TRP 22 to perform the serving-beam selection procedure in dependence on the penalties. Where the network node 18 is co-located with the TRP 22, the processing circuitry 76 is configured to apply the penalties in the serving-beam selection procedure by performing the serving-beam selection procedure in dependence on the penalties. In this latter case, the described functionality of the network node 18 can be considered as a subset of or a supplement to the overall set of functions performed by the TRP 22, for operation as a TRP in the network 10.

Figures 8, 9:
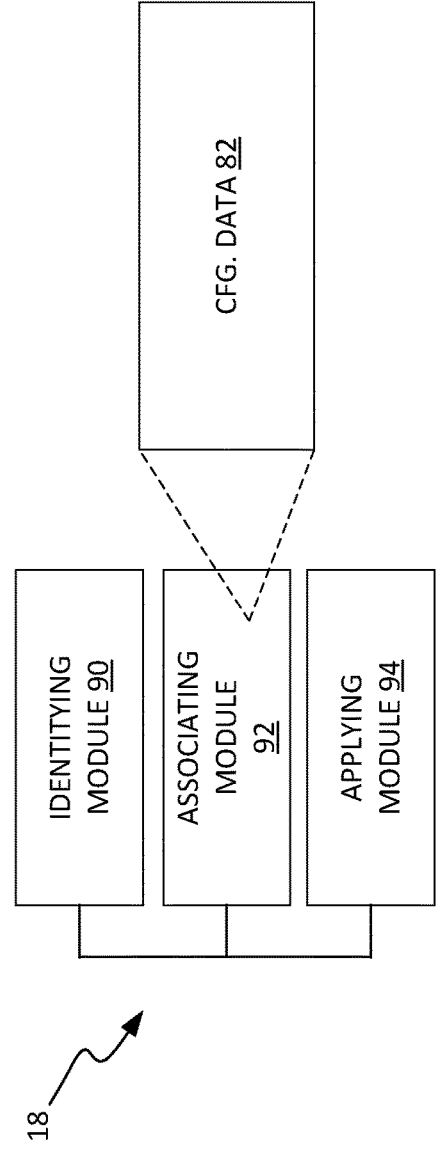
FIG. 8 is a diagram of an example data structure, illustrating rankings of radio beams that are candidates for serving a UE, and associated penalties for identified ones of those beams that are affected by periodic fading at a UE.
FIG. 9 is a block diagram of another embodiment of a network node that is operative to apply penalties in serving-beam selection procedure performed for a UE.

FIG. 8 illustrates a data structure 84, depicted as a table for ease of understanding. The data structure 84 may include at least some information read from the configuration data 82 depicted in FIG. 6 and the network node 18 may maintain separate instances of all or at least UE-specific parts of the data structure 84 for each UE 12 for which it is responsible for determining penalties to apply in corresponding beam-selection procedures for the UEs 12. In an example scenario, a TRP 22 transmits a number of beams 50 to cover a corresponding overall coverage area, with each beam 50 having a designated direction and providing coverage for a corresponding portion of the overall coverage area. Here, there are N beams 50, 50-1 through 50-N.

As seen, the data structure 84 may include a column ("EVAL?") that indicates whether each particular one of the beams 50 should be evaluated for fading periodicity. For the involved UE 12, the data structure 84 includes a column ("CANDIDATE") that indicates whether each particular one of the beams 50 is a candidate for serving the UE 12. Which beams 50 are candidates may change over time, so the data structure 84 can be understood as a "snapshot" of information used with respect to one or more particular evaluation cycles.

The data structure 84 also includes or links to a ranking column ("RAW RANKING") that indicates the baseline ranking of the beams 50 that are candidates for serving the UE 12. Here, "baseline" denotes the rankings without application of any determined penalties. Correspondingly, the data structure 84 includes a column ("PENALIZE?") that indicates whether individual ones of the beams 50 that are candidates for serving the UE 12 should be penalized. The network node 18 determines whether any given beam 50 that is a candidate for serving a UE 12 should be penalized in the serving-beam selection procedure performed to select a serving beam 60 for the UE 12. As explained above, the network node 18 makes the determination for each candidate beam 50 in dependence on whether the UE 12 experiences periodic fading with respect to each candidate beam 50, or, in at least some embodiments, with respect to any candidate beam 50 that is related to the candidate beam 50.

The data structure 84 further includes a column ("P. VALUE") that indicates the determined penalties. In at least some embodiments, the network node 18 determines the life or duration of each penalty, e.g., so that the associated beam 50 is penalized only temporarily. In such embodiments, the data structure 84 includes a timer column ("P. TMR") that indicates the duration of each determined penalty, e.g., by indicating one among a defined number of timers having different expiry periods.

A network node 18 that is remote from a TRP 22 "applies" the penalties determined for beams 50 that are going to be evaluated by the TRP 22 for selecting a serving beam 60 for a UE 12 by sending signaling that indicates at least those portions of the data structure 84 not already known to the TRP 22 for the current evaluation interval, e.g., the newly-determined penalty values, penalty durations, etc.

FIG. 9 illustrates yet another embodiment of the network node 18, where the network node 18 may be regarded as a virtual machine implemented, for example, as computer processing units or functional modules that are configured to carry out the operations described herein. Nonetheless, the depicted units or modules involve physical processing and communication circuits.

In the example, the network node 18 includes (a) an identifying module 90 configured to identify radio beams 50 affected by periodic fading at a UE 12, from among a set 52 of radio beams 50 that are candidates for serving the UE 12, (b) an associating module 92 configured to associate a penalty with each identified one of the radio beams 50, and (c) an applying module 94 configured to apply the penalties in a serving-beam selection procedure that is used to select one of the radio beams 50 for serving the UE 12. The modules 90, 92, and 94 may use configuration data 82 stored in the network node 18, e.g., threshold values, etc.

Further, the modules 90, 92, and 94 are operative to determine penalties, as needed, for each UE 12 that is served by a TRP 22 for which the network node 18 is responsible. And, as noted, the penalty determinations by the network node 18 for each UE 12 may be performed on an ongoing basis, e.g., newly determined in each recurring interval. The interval duration may be, e.g., on the order of a few milliseconds.

With respect to programmatic implementation of the functionality described for a network node 18 herein, in at least one embodiment, a non-transitory computer-readable medium stores computer program instructions that, when executed by a microprocessor or other processing circuit of a network node 18 in a wireless communication network 10, configures the network node 18 to (a) identify radio beams 50 affected by periodic fading at a UE 12, from among a set 52 of radio beams 50 that are candidates for serving the UE 12, (b) associate a penalty with each identified one of the radio beams 50, and (c) apply the penalties in a serving-beam selection procedure that is used to select one of the radio beams 50 for serving the UE 12.

In related example details, the computer program instructions are stored as one or more computer programs (CPs) 80, as seen in FIG. 6, with the storage 78 constituting one or more types of computer-readable media that provides storage of at least some persistence for the computer program instructions, e.g., in one or both of a long-term or non-volatile storage medium and a short-term or volatile medium, such as working computer memory used for program execution. In either case, the storage constitutes non-transitory storage of at least some minimum persistence, wherein the computer program instructions are held for execution or recall.

FIG. 10 illustrates an example method 1000 of operation by a network node 18. The method 1000 may be carried out on a continuing or repeating basis, e.g., with respect to the described monitoring operations. In at least one embodiment, the processing circuitry 76 of the network node 18 comprises one or more microprocessors or other computer circuitry that is configured to carry out the method 1000 based on executing computer program instructions from one or more computer programs 80 held in the storage 78.

Regardless of the implementation details, the method 1000 includes the network node 18 (a) identifying (Block 1002) radio beams 50 that are affected by periodic fading at a UE 12, from among a set 52 of radio beams 50 that are candidates for serving the UE 12, (b) associating (Block 1004) a penalty with each identified one of the radio beams 50, and applying (Block 1006) the penalties in a serving-beam selection procedure that is used to select one of the radio beams 50 for serving the UE 12.

Each radio beam 50 in the set 52 has a corresponding ranking determined in dependence on radio-signal measurement reports from the UE 12, and applying 1006 the penalties in the serving-beam selection procedure comprises penalizing the corresponding ranking of each identified one of the radio beams 50 according to the associated penalty. The ranking of each beam 50 comprises a relative or absolute value that reflects how well a corresponding signal-strength or quality measure compares to like measures for the other beams 50 to be considered in the serving-beam selection procedure.

Unless doing so would exclude all of the radio beams 50 in the set 52 from selection consideration in the serving-beam selection procedure, in one or more embodiments of the method 1000, the penalties associated with the identified ones of the radio beams 50 exclude the identified ones of the radio beams 50 from consideration in the serving-beam selection procedure. In such embodiments, the penalties serve as "do not consider" flags for the serving-beam selection procedure, meaning that penalized ones of the candidate beams 50 are not considered for selection.

In one or more other embodiments, associating (Block 1004) the penalty with each identified one of the radio beams 50 comprises determining a penalty value for each identified one of the radio beams 50 in dependence on a determined severity of the periodic fading at the UE 12 for each identified one of the radio beams 50. In yet other embodiments, there is only one value of penalty—i.e., a beam 50 either is or is not penalized, but the penalized beams are still considered in the serving-beam selection procedure, although the penalization may change how they rank.

One or more embodiments of the method 1000 include determining a duration of the associated penalty in dependence on a determined severity of the periodic fading at the UE 12 for each identified one of the radio beams 50. Further, as noted, the method 1000 in one or more embodiments is repeated in recurring evaluation intervals, such that new penalty decisions are made with respect to the UE 12 in each evaluation interval.

In at least one embodiment, associating (Block 1004) the penalty with each identified one of the radio beams 50 further comprises, for at least one of the identified ones of the radio beams 50, associating the penalty with each of one or more directionally-adjacent ones of the radio beams 50 in the set 52. As explained, two or more of the candidate beams 50 may be deemed to be related, e.g., each beam 50 may be considered as forming a related group of beams 50 with the directionally-adjacent beams 50, or with only one of the adjacent beams 50.

In at least one embodiment, identifying (Block 1002) radio beams 50 that are affected by periodic fading at the UE 12 comprises determining whether radio-signal measurements reported by the UE 12 for respective ones of the radio beams 50 in the set 52 exhibit periodic fading with a fading periodicity above or in a range that corresponds to a LA time constant used by the involved TRP(s) 22.

In an embodiment where the network node 18 is remote from a TRP 22, the TRP 22 performs a serving-beam selection procedure for a UE 12 served by the TRP 22, and the network node 18 sends signaling to the TRP 22, to indicate the penalties and thereby cause the TRP 22 to perform the serving-beam selection procedure in dependence on the penalties. Alternatively, in an embodiment where the network node 18 is co-located with the TRP 22, applying (Block 1006) the penalties to the serving-beam selection procedure comprises the network node 18 performing the serving-beam selection procedure in dependence on the penalties.

FIG. 11 illustrates a method 1100 of operation by a network node 18 which can be understood as a variation of the method 1000. The method 1100 includes (Block 1102) determining whether individual beams 50 in a set 52 of beams 50 are candidates for serving a UE 12 to satisfy a condition for penalization, and conditionally penalizing (Block 1104) individual ones or related groups of the beams 50, in dependence on the determination.

Thus, in the context of the method 1100, the network node 18 conditionally penalizes one or more candidate beams 50 in a set 52 of candidate beams 50 that, with respect to a TRP 22, are candidates for serving a UE 12. Each penalized candidate beam 50 is excluded from or disfavored in a serving-beam selection procedure used to select a serving beam 60 for the UE 12, from among the set 52 of candidate beams 50. The penalization of individual ones or related groups of the candidate beams 50 in the set 52 of candidate beams 50 is conditioned on determining whether the UE 12 experiences periodic fading with respect to the individual ones or related groups of the candidate beams 50 in the set 52 of candidate beams 50.

Broadly, the technique(s) disclosed herein involve determining beam penalties for beams 50 for which a UE 12 experiences periodic fading, so that those beams 50 are deprecated in the context of a serving-beam selection procedure used to select a "best" one among a set 52 of beams 50 that are candidates for serving the UE 12. For example, consider three beams 50-1, 50-2, and 50-3. Based only on signal-strength or quality measurements in an example scenario, the beam 50-2 has the highest strength or quality measurement and therefore is ranked "best" among the three beams 50. The beam 50-1 has the next-highest strength or quality measurement and therefore is ranked "second best" among the three beams 50, and the beam 50-3 is ranked last or least preferable.

However, upon determination that the UE 12 experiences periodic fading with respect to the beam 50-2, e.g., fading that is detected as being periodic with at least a defined minimum amount of signal strength or quality loss during the fading events and with a fading periodicity that is relevant to the LA time constant(s) used by the involved TRP(s) 22, a penalty is associated with the beam 50-2. The penalty discounts the ranking of the beam 50-2, e.g., it is a negative offset that is applied to the signal strength or quality measurement reported by the UE 12 for the beam 50-2. By comparing the offset strength or quality of the beam 50-2 to the unadjusted signal strength or quality measurement reported by the UE 12 for the beams 50-1 and 50-3, the overall ranking of the beams 50 may change, in dependence on how much better the beam 50-3 was in the original rankings and the degree or size of penalty applied.

An applicable scenario is where periodic fading significantly impacts the performance of LA being performed by a TRP 22 with respect to one or more UEs 12. For example, problematic periodic fading may occur for UEs 12 moving towards or away from the TRP 22 at speeds of 50 km/h or greater. Of course, the critical speeds or speed ranges depend on a variety of factors and the TDD configuration in use at the TRP 22.

For example, a TDD configuration that is downlink-heavy may cause poor LA performance for UEs 12 moving above a certain speed, while a TDD configuration that includes a better balance or distribution of uplink subframes may allow for good LA performance for the same speed or higher. A key recognition here is that a given LA time constant may result in LA that is too slow for the periodicity of channel variations being experienced by one or more of the involved UEs 12. Here, the LA time constant may be understood as the convergence time of the LA, and when the LA time constant is on par with or longer than the time available until next fading dip between periodic fading events, the transmission parameters controlled by LA are driven to lower-performance values despite the existence of good channel conditions between the fading dips.

Consider an example case where a UE 12 performs RSRP measurements for CSI-RS transmitted in each of a plurality of beams 50 transmitted by a TRP 22, and reports measurements for the N best ones of the beams 50. Here, "N" is an integer, e.g., three, four, five, etc., and "best" means the highest values of measured RSRP. On a comparative scoring or ranking basis, the N beams 50 have an ordering corresponding to their respective RSRP measurements at the UE 12. Of course, this ranking pertains to the particular UE 12, in the sense that the measurements are made by the UE 12 and provide a basis for deciding which beam 50 from the TRP 22 is best for serving the UE 12.

While the "raw" rankings reflect the underlying unadjusted evaluation measure for each of the beams 50, e.g., the underlying RSRP measures or some value derived therefrom, serving-beam selection according to the network node 18 provides a more nuanced or intelligent approach by considering whether individual ones in a set 52 beams 50 that are candidates for serving a particular UE 12 are affected by periodic fading at the UE 12.

In such approaches, the set 52 of beams 50 may be referred to as a "Grid of Beams" or "GoB" for short. In one or more embodiments, the network node 18 initializes its beam-penalty operations with respect to a particular UE 12 by associating a void penalty with each of the beams 50 in the GoB under consideration. Here, a "void" penalty is no penalty. As an example, the penalty type is an offset or adjustment factor expressed in dBs, applied as a reduction factor to the RSRP measurement reported by the UE 12 for each beam 50. Referring to the reduction factor as a "BeamSpecificOffset", the network node 18 initializes the BeamSpecificOffset associated with each beam 50 in the GoB to 0 dB, meaning no initial penalty.

Over one or more time periods, the network node 18 evaluates reported values of RSRP from the UE 12, for each of the beams 50 in the GoB, and assesses the reported values to determine whether they are characteristic of periodic fading at the UE 12. As an example, the network node 18 determines whether the reported values for each beam 50 indicate that the beam 50 is affected by periodic fading at the UE 12.

Determining whether the beam 50 is affected by periodic fading at the UE 12 comprises, for example, one or more qualifying or conditioning operations. First, the network node 18 determines whether the RSRP or other radio-signal measurements made by the UE 12 for the beam 50 exhibits a periodic fading pattern, or whether SRS from the UE 12 exhibit a periodic fading patter, denoted as FadingPeriodicityPattern or simply FPP. Further, in one or more embodiments, the network node 18 further determines whether the periodicity of fading exhibited in the FPP is deemed to be problematic.

In an example implementation, the network node 18 deems the detected periodic fading to be problematic if the periodicity of the fading is in the range of or faster than the LA time constant used by the TRP 22 for performing LA for the radio connections supported via the beam 50. As a non-limiting example, "in the range" of the LA time constant means that the period of the detected periodic fading is in the same order as the LA time constant. Periodic fading having that periodicity, or a faster periodicity, may be deemed to be problematic. Additionally, or alternatively, in the context of determining whether detected periodic fading is deemed to be problematic—i.e., warranting beam penalization—the network node 18 further evaluates one or more of: whether the severity of fading satisfies a threshold level of fading, such as measured in dB loss; and whether the periodic fading persists for longer than some defined interval Ti.

For each beam 50 that the network node 18 deems to be affected by periodic fading at the UE 12, the network node associates a penalty with the beam 50 by changing the value of the corresponding BeamSpecificOffset from its initialized void value to a non-void value that imposes a penalty on the beam 50, in terms of how the beam 50 ranks within the context of a serving-beam selection procedure to be performed for the UE 12 with respect to the GoB. For example, the network node 18 sets the BeamSpecificOffset to X dB, in a case where the beams 50 in the GoB are ranked for purposes of serving-beam selection according to corresponding per-beam RSRP measurements expressed in dB. In this context, X may be a fractional or integer value, e.g., −0.5 dB, or −1 dB.

Of course, the BeamSpecificOffset maintained for each beam 50 in the GoB need not be stored as a negative value—the point is that its value, as a penalty, is subtracted from, or applied as an offset to, the corresponding "raw" RSRP value reported for the beam 50, to "penalize" the beam 50 with respect to consideration in the serving-beam selection procedure performed for the UE 12. Notable points include that the "units" of measure used to express the BeamSpecificOffsets for each beam 50 in a GoB depend on the units of measure used to express the raw beam rankings or scores. For example, the beams 50 may be ranked in terms of Channel Quality Index (CQI) values comprising integer values reflecting quantized measures of channel quality. Corresponding BeamSpecificOffsets comprise, for example, integer values that deduct from the reported CQI values.

Other points of implementation flexibility involve determining the BeamSpecificOffsets or, more generally, the beam penalties, as weighted or proportionate values that reflect an assessment of the severity of periodic fading experienced at the UE 12 with respect to the individual beams 50 in the GoB. Weighted penalties can be but need not be continuous values. For example, the network node 18 may define a set of penalty values going from smallest penalty to largest penalty and decide which penalty value from the set to apply to a particular beam 50 in dependence on the severity of periodic fading experienced by the UE 12 for the beam 50. Alternatively, the beam penalties may be defined or used as all-or-nothing penalties, meaning that a beam 50 in the GoB is, at least within the current evaluation period, either considered to be unpenalized or penalized, with penalized beams 50 being excluded from consideration in the serving-beam selection procedure.

Penalizing beams 50 in this manner can be understood as effectively zeroing or nulling the corresponding beam rankings. However, the network node 18 in one or more embodiments does not apply exclusionary penalties in scenarios where the exclusions would leave no beams 50 remaining for selection consideration. Further, even in embodiments that express penalties in 0 dB or other signal-related units of measure, the serving-beam selection procedure can be configured to exclude any beam 50 that has a non-void (non-zero) penalty associated with it. In a simplifying extension of that approach, the network node 18 may determine penalties as simple logical flags, where setting the flag for a beam 50 means that the beam 50 shall be treated as a penalized beam. Thus, in scenarios where the network node 18 is remote from a TRP 22 that performs the serving-beam selection procedure for a particular UE 12, for a set 52 of beams 50 that are controlled by the TRP 22 and are candidates for serving the UE 12, the network node 18 may send the penalties as computed values, e.g., penalties expressed in dBs, or may send the penalties as logical flags, e.g., a bitmap corresponding to the set 52 of beams 50. Each position in the bitmap corresponds to a respective one of the beams 50 and the state of the bit in that position indicates whether the respective beam 50 is or is not penalized.

A further point of flexibility involves penalty persistence. Because reception conditions at the UE 12 are dynamic, the penalties associated with particular beams 50 in one evaluation cycle may or may not be appropriate at future times. Making new penalty decisions in recurring evaluation cycles, e.g., as often as the serving-beam selection procedure runs for the UE 12, prevents the beam penalties from becoming stale or aged and accounts for the fact that the beams 50 that are candidates for serving the UE 12 at any particular time may change with respect to any particular previous or future time, e.g., as a function of mobility of the UE 12.

Controlling penalty persistence in at least one embodiment involves using penalty timers. Upon associating a penalty with a beam 50, with respect to a particular UE 12 that has the beam 50 as one of its candidates for serving-beam selection, the network node 18 starts a corresponding penalty timer, which may be a software-based timer running in the processing circuitry 76 of the network node 18.

Penalty timers offer several points of advantage and flexibility. As one example, the penalty expires upon expiration of its associated penalty timer. By setting the expiry period of the penalty timers in relation to the period of the evaluation intervals used to make penalty decisions, penalties may be made to expire within the current evaluation interval and before the next evaluation interval. That arrangement provides the advantage of allowing longer intervals between making new penalty decisions while simultaneously preventing the penalty associated with any particular beam 50 from becoming stale. For example, upon expiry of its associated penalty timer, the corresponding penalty reverts back to its void value or state—i.e., no penalization of the involved beam 50 with respect to the involved UE 12.

Further, rather than simply using penalty timers to control how long an associated penalty remains active or valid, the weight of the penalty may change with the running of the associated penalty timer, decreasing from an initial maximum penalty value down to a minimum penalty value or no penalty value. The weighting may be a continuous or stepped function of the remaining time in the expiry period. A further point of flexibility used in one or more embodiments is setting the expiry period of a penalty timer of a beam 50 in dependence on the periodic fading experienced at the involved UE 12 for the beam 50.

With the above-detailed points of flexibility in mind, an example approach to determining per-beam penalties as BeamSpecificOffsets is as follows. For a beam 50 where rapid variations in time and large amplitude characterizes the FPP for the involved UE 12, the network node 18 sets the BeamSpecificOffset for the beam 50 to X dB. Where rapid variations in time and small amplitude characterizes the FPP for the involved UE 12, the network node 18 sets the BeamSpecificOffset for the beam 50 to Y dB, where Y<X. Where slow variations in time and small amplitude characterizes the FPP for the involved UE 12, the network node 18 sets the BeamSpecificOffset for the beam 50 to Z dB, where Z<Y.

Similarly, an example approach to determining penalty timer is as follows. For a beam 50 where rapid variations in time and large amplitude characterizes the FPP for the involved UE 12, the network node 18 sets the timer for the corresponding beam penalty, e.g., the BeamSpecificOffset for the beam 50, to P milliseconds (ms). Where rapid variations in time and small amplitude characterizes the FPP for the involved UE 12, the network node 18 sets the penalty timer to Q ms, where Q<P. Where slow variations in time and small amplitude characterizes the FPP for the involved UE 12, the network node 18 sets the penalty timer to R ms, where R<Q.

In another example of controlling or defining penalty timers, the penalty timer used to time expiry of a beam penalty may be set in dependence on a detected or reported velocity of the involved UE 12. Because beam penalties for a UE 12 moving at a high velocity are likely to become outdated more rapidly than beam penalties for a UE 12 that is stationary or moving at a low velocity, the penalty timers used for timing the expiry of beam penalties used for the serving-beam selection procedure for a particular UE 12 are, in one or more embodiments, determined in dependence on the speed and direction (velocity) of the UE 12. Here, the term "low" and "high" are relative and may be defined by one or more thresholds. For example, UEs 12 that are detected or reported as having rates-of-travel below, say, 30 km/h, are considered to be low-velocity UEs, while UEs 12 that are detected or reported as having rates-of-travel above 30 km/h are considered to be high-velocity UEs. Of course, higher or lower rates-of-travel may be used to establish the thresholds, e.g., in dependence on the geography of the involved coverage areas, the type(s) of vehicular traffic in the involved coverage areas, etc. Further, more granularity may be used to define a set of timer expiry periods, with one in the set selected in dependence on the speed of the involved UE 12.

Also as noted, the serving-beam selection procedure for a particular UE 12 may be performed periodically, e.g., every 10 ms. The network node 18 may determine penalties on the same time basis, in synchronization with the performance of the serving-beam selection procedure, so that the procedure has new or fresh penalty decisions each time it runs. The expiry period of the penalty timers may be set in view of how frequently new penalty decisions are made, meaning that penalties may expire before or in conjunction with the beginning of a new penalty-decision cycle. If the penalty-decision cycle is slower than the serving-beam selection cycle, the expiry period of the penalty timers to control whether the penalties determined in penalty-decision cycle remain active for longer than one serving-beam selection cycle.

Further refinements and extensions used in one or more embodiments of a network node 18 or its associated method of operation include considering beam groups where the beams 50 in the beam group exhibit similar FPP characteristics with respect to a UE 12. Such a scenario might arise with respect to "adjacent" beams 50 in a millimeter wave (mmW) installation with a large number of beams 50. That is, when a TRP 22 uses a large number of high-frequency beams 50 to cover a defined angular range, a beam 50 transmitted in the n-th direction may be considered to have as its adjacent beams, at least the beam 50 transmitted at the (n+1)-th direction and the beam 50 transmitted at the (n−1)-th direction. Put simply, a UE 12 may experience similar periodic fading with respect to each beam 50 in a group of beams 50 pointing in similar directions. Here, the beams 50 may be downlink radio beams used by a TRP 22 to transmit reference signals, such as CSI-RS, for use by the UE 12 in assessing beam qualities or preferences.

In such cases, the network node 18 in one or more embodiments may apply the same penalty to all beams 50 in the affiliated group of beams 50. In a further alternative, the BeamSpecificOffsets or other type of beam penalty for a set of sufficiently "similar" beams 50 (e.g., adjacent beams) could be applied using a Gaussian filter or similar spatial smoothing, such that a defined penalty value is applied in smoothed manner over the group of beams 50.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a network node of a wireless communication network, the method comprising:
   identifying radio beams that are affected by periodic fading at a User Equipment (UE), from among a set of radio beams that are candidates for serving the UE;
   associating a penalty with each identified one of the radio beams; and
   applying the penalties in a serving-beam selection procedure that is used to select one of the radio beams for serving the UE,
   wherein identifying radio beams affected by periodic fading at the UE comprises determining whether radio-signal measurements reported by the UE for respective ones of the radio beams in the set exhibit periodic fading with a fading periodicity above or in a range that corresponds to a Link Adaptation (LA) time constant used by one or more Transmission Reception Points (TRPs) in the wireless communication network that are associated with the radio beams in the set.

2. The method of claim 1, wherein each radio beam in the set has a corresponding ranking determined in dependence on radio-signal measurement reports from the UE, and wherein applying the penalties in the serving-beam selection procedure comprises penalizing the corresponding ranking of each identified one of the radio beams according to the associated penalty.

3. The method of claim 1, wherein, unless doing so would exclude all of the radio beams in the set from selection consideration in the serving-beam selection procedure, the penalties associated with the identified ones of the radio beams excludes the identified ones of the radio beams from consideration in the serving-beam selection procedure.

4. The method of claim 1, wherein associating the penalty with each identified one of the radio beams comprises determining a penalty value for each identified one of the radio beams in dependence on a determined severity of the periodic fading at the UE for each identified one of the radio beams.

5. The method of claim 1, further comprising, for each identified one of the radio beams, determining a duration of the associated penalty in dependence on a determined severity of the periodic fading at the UE for each identified one of the radio beams.

6. The method of claim 1, wherein the method is repeated in recurring evaluation intervals, such that new penalty decisions are made with respect to the UE in each evaluation interval.

7. The method of claim 1, wherein associating the penalty with each identified one of the radio beams further comprises, for at least one of the identified ones of the radio beams, associating the penalty with each of one or more directionally-adjacent ones of the radio beams in the set.

8. The method of claim 1, wherein the network node is remote from the TRP, the TRP performs the serving-beam selection procedure, and wherein applying the penalties in the serving-beam selection procedure comprises the network node sending signaling to the TRP, to indicate the penalties and thereby cause the TRP to perform the serving-beam selection procedure in dependence on the penalties.

9. The method of claim 1, wherein the network node is co-located with the TRP, and wherein applying the penalties to the serving-beam selection procedure comprises the network node performing the serving-beam selection procedure in dependence on the penalties.

10. A network node configured for operation in a wireless communication network, the network node comprising:
communication interface circuitry; and
processing circuitry operative to send and receive signals via the communication interface circuitry and configured to:
identify radio beams affected by periodic fading at a User Equipment (UE), from among a set of radio beams that are candidates for serving the UE;
associate a penalty with each identified one of the radio beams; and
apply the penalties in a serving-beam selection procedure that is used to select one of the radio beams for serving the UE,
wherein the processing circuitry is configured to identify radio beams affected by periodic fading at the UE by determining whether radio-signal measurements reported by the UE for respective ones of the radio beams in the set exhibit periodic fading with a fading periodicity above or in a range that corresponds to a Link Adaptation (LA) time constant used by one or more Transmission Reception Points (TRPs) in the wireless communication network that are associated with the radio beams in the set.

11. The network node of claim 10, wherein each radio beam in the set has a corresponding ranking determined in dependence on radio-signal measurement reports from the UE, and wherein the processing circuitry is configured to apply the penalties in the serving-beam selection procedure by penalizing the corresponding ranking of each identified one of the radio beams according to the associated penalty.

12. The network node of claim 10, wherein, unless doing so would exclude all of the radio beams in the set from selection consideration in the serving-beam selection procedure, the penalties associated with the identified ones of the radio beams exclude the identified ones of the radio beams from selection consideration in the serving-beam selection procedure.

13. The network node of claim 10, wherein the penalty associated with each identified one of the radio beams has a value dependent on a determined severity of the period fading at the UE for the identified one of the radio beams.

14. The network node of claim 10, wherein the penalty associated with each identified one of the radio beams has a corresponding duration dependent on a determined severity of the periodic fading at the UE for the identified one of the radio beams.

15. The network node of claim 10, wherein the processing circuitry is configured to make new penalty decisions for the UE in recurring evaluation intervals.

16. The network node of claim 10, wherein, for at least one of the identified ones of the radio beams, the processing circuitry is further configured to associate the penalty with each of one or more directionally-adjacent ones of the radio beams in the set.

17. The network node of claim 10, wherein the network node is remote from the TRP, the TRP performs the serving-beam selection procedure, and wherein the processing circuitry is configured to apply the penalties in the serving-beam selection procedure by sending signaling to the TRP, to indicate the penalties and thereby cause the TRP to perform the serving-beam selection procedure in dependence on the penalties.

18. The network node of claim 10, wherein the network node is co-located with the TRP, and wherein the processing circuitry is configured to apply the penalties in the serving-beam selection procedure by performing the serving-beam selection procedure in dependence on the penalties.

19. A network node configured for operation in a wireless communication network, the network node comprising:
an identifying module configured to identify radio beams affected by periodic fading at a User Equipment (UE), from among a set of radio beams that are candidates for serving the UE, wherein identifying radio beams affected by periodic fading at the UE comprises determining whether radio-signal measurements reported by the UE for respective ones of the radio beams in the set exhibit periodic fading with a fading periodicity above or in a range that corresponds to a Link Adaptation (LA) time constant used by one or more Transmission Reception Points (TRPs) in the wireless communication network that are associated with the radio beams in the set;
an associating module configured to associate a penalty with each identified one of the radio beams; and
an applying module configured to apply the penalties in a serving-beam selection procedure that is used to select one of the radio beams for serving the UE.

20. A non-transitory computer-readable medium storing a computer program comprising instructions that, when executed by processing circuitry of a network node in a wireless communication network, causes the network node to:
identify radio beams affected by periodic fading at a User Equipment (UE), from among a set of radio beams that are candidates for serving the UE, wherein identifying radio beams affected by periodic fading at the UE comprises determining whether radio-signal measurements reported by the UE for respective ones of the radio beams in the set exhibit periodic fading with a fading periodicity above or in a range that corresponds to a Link Adaptation (LA) time constant used by one or more Transmission Reception Points (TRPs) in the wireless communication network that are associated with the radio beams in the set;
associate a penalty with each identified one of the radio beams; and
apply the penalties in a serving-beam selection procedure that is used to select one of the radio beams for serving the UE.

* * * * *